(12) United States Patent
Hara et al.

(10) Patent No.: US 7,191,308 B2
(45) Date of Patent: Mar. 13, 2007

(54) MEMORY DEVICE WITH PREREAD DATA MANAGEMENT

(75) Inventors: Fumio Hara, Higashikurume (JP);
Shigemasa Shiota, Tachikawa (JP);
Hiroyuki Goto, Higashimurayama (JP);
Hirofumi Shibuya, Matsuda (JP)

(73) Assignee: Renesas Technology Corp., Tokyo (JP)

( * ) Notice: Subject to any disclaimer, the term of this patent is extended or adjusted under 35 U.S.C. 154(b) by 307 days.

(21) Appl. No.: 10/811,961

(22) Filed: Mar. 30, 2004

(65) Prior Publication Data
US 2004/0205301 A1  Oct. 14, 2004

(30) Foreign Application Priority Data
Apr. 14, 2003   (JP)   ............... 2003-108603

(51) Int. Cl.
*G06F 12/00* (2006.01)
*G06F 12/02* (2006.01)

(52) U.S. Cl. .................. 711/213; 711/103; 711/137; 711/154

(58) Field of Classification Search ............. None
See application file for complete search history.

(56) References Cited
U.S. PATENT DOCUMENTS 5,973,964 A * 10/1999 Tobita et al. ......... 365/185.29
6,516,389 B1 * 2/2003 Uchihori .............. 711/137
6,553,476 B1 * 4/2003 Ayaki et al. ........... 711/204
6,625,712 B2 * 9/2003 Shibazaki et al. ...... 711/202
6,754,779 B1 * 6/2004 Magro ................ 711/137
6,965,967 B2 * 11/2005 Takaichi .............. 711/113
2003/0041214 A1 * 2/2003 Hirao et al. ........... 711/137

FOREIGN PATENT DOCUMENTS

JP    2001-125829    5/2001

\* cited by examiner

*Primary Examiner*—Hyung Sough
(74) *Attorney, Agent, or Firm*—Miles & Stockbridge P.C.

(57) ABSTRACT

The present invention provides a memory device that can flexibly decide the data to be preread. The memory device according to the present invention includes: a nonvolatile memory; a buffer memory having a higher access speed than the nonvolatile memory; and a control circuit. The control circuit creates a preread data management table that associates a logical address of preread data specified by a preread command inputted from the outside and a buffer memory address for storing the preread data. Moreover, the control circuit reads data specified by the command from the nonvolatile memory and stores it in the buffer memory as preread data. When a logical address specified in a read command inputted from the outside matches a logical address associated by the preread data management table, the control circuit outputs corresponding preread data from the buffer memory.

20 Claims, 9 Drawing Sheets

FIG. 4

| PREREAD DATA SPECIFICATION METHOD | READ TIMING FROM FLASH MEMORY |
|---|---|
| ADDRESS SPECIFICATION | (1) WHEN A PREREAD COMMAND IS ISSUED |
| FILE SPECIFICATION | (2) BACKGROUND (COMMAND WAIT STATE) |

FIG. 7

| PREREAD DATA UPDATE SPECIFICATION | PREREAD DATA UPDATE METHOD |
|---|---|
| OVERWRITE PERMISSION | • SPECIFY A BUFFER MANAGEMENT ALGORITHM SUCH AS FIFO AND DELETE PORTIONS EXCEEDING BUFFER CAPACITY. |
| OVERWRITE PERMISSION (SELECTION ALGORITHM) | • JUDGMENT BASED ON PREREAD DATA ACCESS FREQUENCY.<br>( • SET OVERWRITE PERMISSION/ INHIBITION OF PREREAD DATA AT COMMAND ACCEPTANCE. ) |
| OVERWRITE INHIBITION | • RETURN AN ERROR WHEN A COMMAND WITH PREREAD SPECIFIED IS ACCEPTED. |

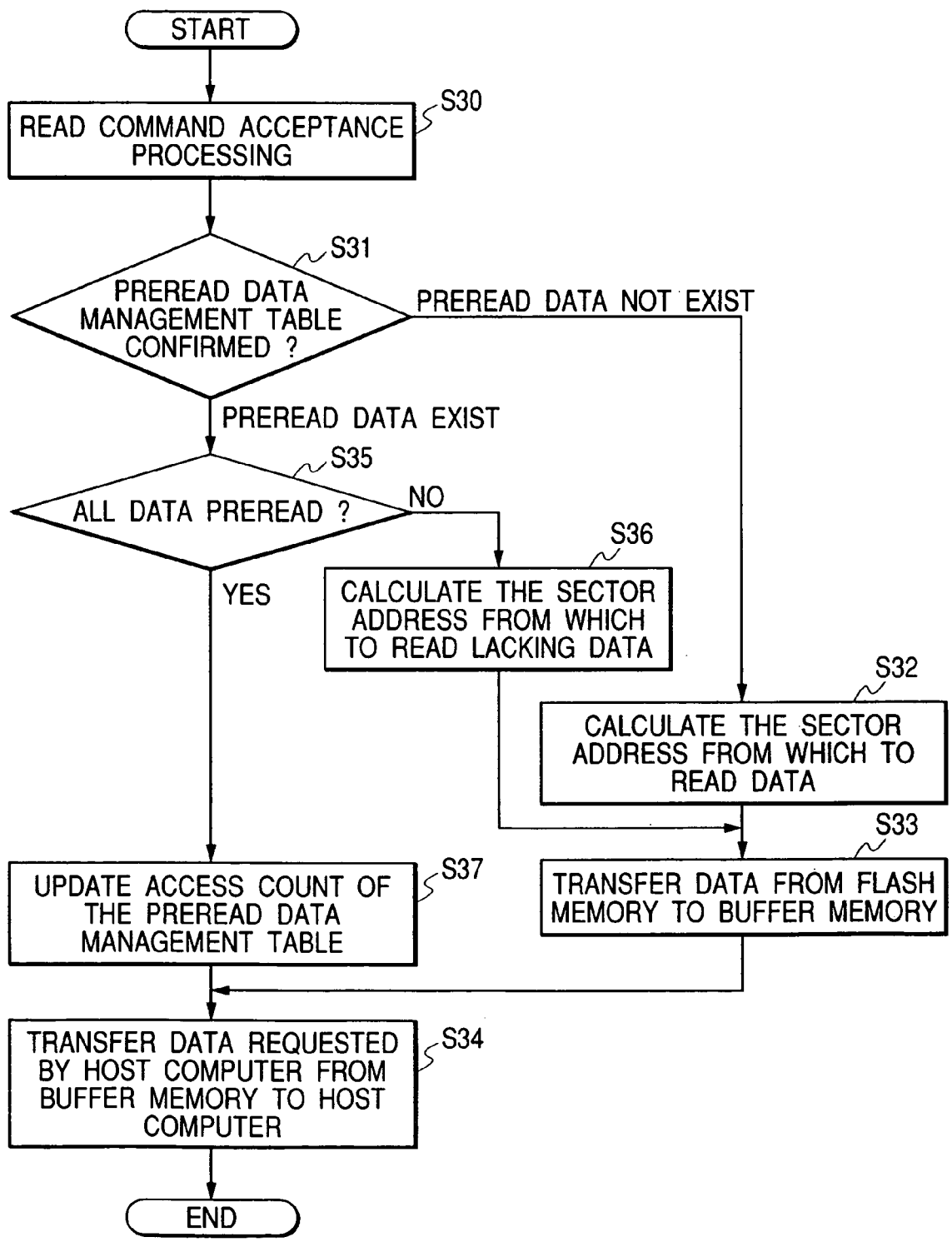

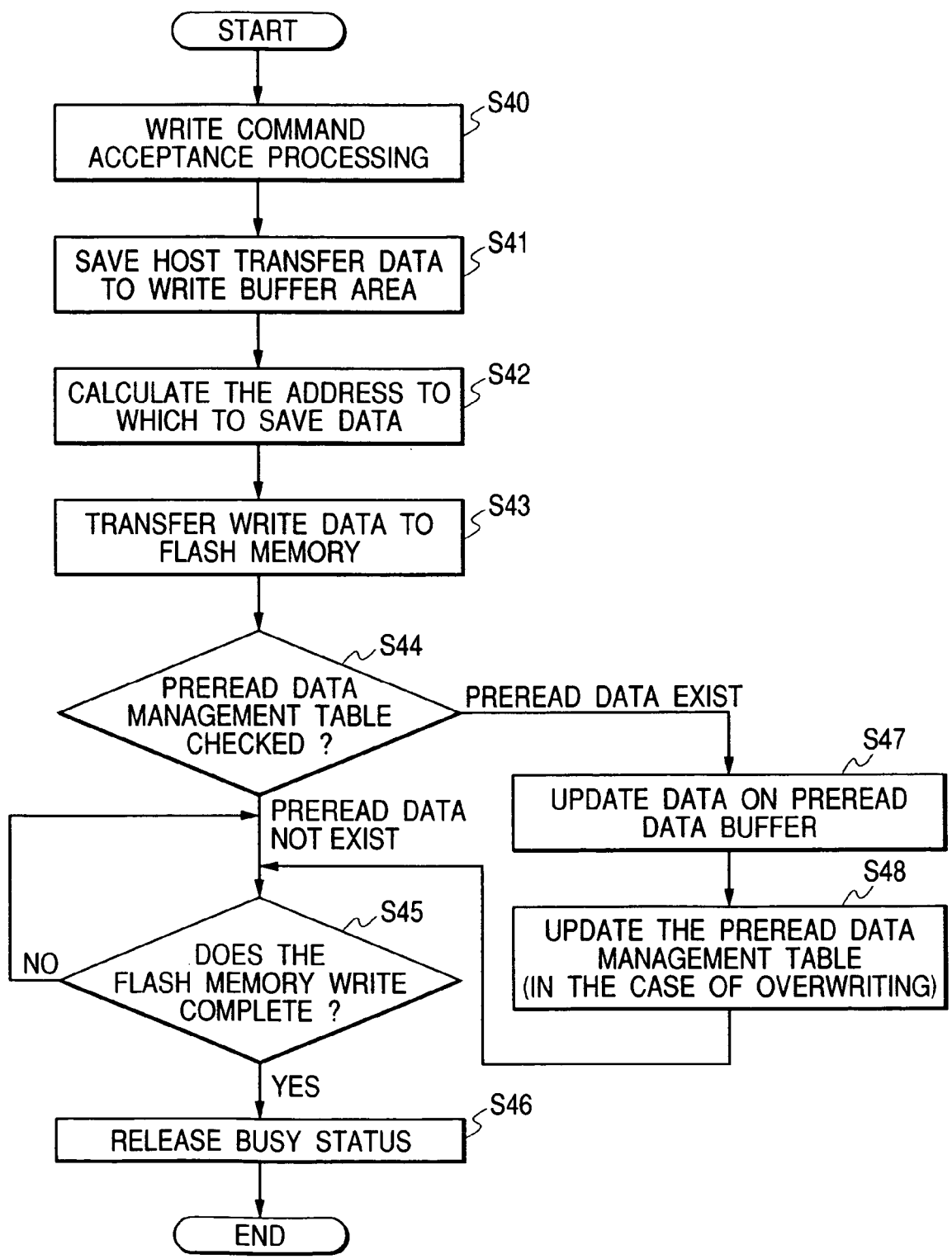

MEMORY DEVICE WITH PREREAD DATA MANAGEMENT

CROSS-REFERENCE TO RELATED APPLICATION

The present application claims priority from Japanese patent application JP 2003-108603 filed on Apr. 14, 2003, the content of which is hereby incorporated by reference into this application.

BACKGROUND OF THE INVENTION

The present invention relates to a memory device such as a hard disk drive unit or a flash memory card, and more particularly to an invention effectively applied to a technique for prereading storage information of a storage medium such as a nonvolatile memory to a buffer memory.

In a memory device comprising a controller, a buffer memory, a storage medium, and the like, upon arrival of a read request from a host device, the controller reads the data expected to be used later from the storage medium before the read request arrives, and stores it in the buffer memory. This technique is called a preread technique. For example, a hard disk drive (HDD) unit described in Patent Publication 1 has a disk cache and caches expected data to the disk cache in advance to minimize slow access to a magnetic disk. A hard disk controller prereads part of data stored in the magnetic disk and saves it to the disk cache.

[Patent Publication 1]

Japanese Unexamined Patent Publication No. 2001-125829 (sections 24 to 27)

SUMMARY OF THE INVENTION

The capability of data readout from storage media such as a magnetic disk and a flash memory cannot follow high-speed host interfaces. Therefore, it is necessary to decrease reading from the storage media during a read request from a host device. For this reason, it is effective to preread data from the storage media to store it in a buffer memory in advance. However, the data to be preread is decided by a controller of a memory device and users cannot use a preread function. In short, if the controller decides the data to be preread according to a predetermined algorithm, it will not be easy to preread the data expected to be frequently used into a buffer memory in advance and will be difficult to maximize the effect of reducing access time by preread.

An object of the present invention is to provide a memory device that can flexibly decide the data to be preread.

Another object of the present invention is to provide a memory device that can easily maximize the effect of reducing access time by preread.

The aforementioned and other objects and novel characteristics of the present invention will become apparent from the description of this specification and the accompanying drawings.

Briefly described below are the effects obtained by the representative examples of the invention disclosed in this patent application.

[1] A memory device according to the present invention includes: a nonvolatile memory (2); a buffer memory (4) having a higher access speed than the nonvolatile memory; and a control circuit (5). The control circuit creates a preread data management table (Ti) that associates a logical address of preread data specified by a preread command inputted from the outside and a buffer memory address for storing the preread data. Moreover, the control circuit reads data specified by the command from the nonvolatile memory and stores it in the buffer memory as preread data. When a logical address specified in a read command inputted from the outside matches a logical address associated by the preread data management table, the control circuit outputs corresponding preread data from the buffer memory.

According to the aforementioned means, preread data can be specified from the outside of the memory device by the preread command. Therefore, the data to be preread can be flexibly decided to maximum the effect of reducing access time by preread. The read performance of the memory device depends on the read performance of the nonvolatile memory itself, which is a storage medium. Thus, upon a read request from the outside, by increasing the output of preread data from the buffer memory in place of reading from the storage medium, system performance can be increased. Plural pieces of preread data can be specified by plural preread commands as long as the capacity of the buffer memory permits.

As an embodiment of the present invention, the preread command specifies preread data by a logical address. As typified by a master boot record or FAT (file allocation table), since there are cases where users can easily keep track of logical addresses, specification by logical addresses is advantageous in that preread data can be directly specified.

The preread command may specify preread data by a file name. Generally, there are cases where users of the memory device cannot keep track of logical addresses on the flash memory 2 that are managed by the OS (operating system). The users can conveniently keep track of data by file names, so that satisfactory operability on data preread can be achieved.

The control circuit may transfer preread data during execution of a preread command. Also, after creating a preread data management table in advance, it may transfer preread data to the buffer memory in a predetermined timing. Thereby, the control circuit can transfer preread data to the buffer memory in a command wait state after the termination of execution of the preread command. The preread data transfer processing prevents the occurrence of situations such as a delay in read access and other operations due to preread data transfer processing.

As an embodiment of the present invention, the preread data management table may comprise areas for holding a start logical address of preread data (30), a start memory address of an area storing the preread data (31), and a data count of the preread data (32).

The preread data management table may include a flag (33) indicating the validity of corresponding preread data.

The preread data management table may include an area (35) for holding a file name containing preread data. For example, in the FAT file system, when a file is fragmented, since one piece of file data is managed by plural split preread data management tables, the area for holding a file name is usefully used for response processing for access with a file name specified. That is, corresponding preread data management tables can be searched by the file name, so that access speed to required preread data on the buffer memory is further increased.

The preread data management table may include an area (34) for holding an access count of preread data. When there is no unused area for storing preread data in the buffer memory, the card controller 5 searches for a buffer memory address infrequently accessed, based on an access count held in the preread data management table, and can allocate an area of the located buffer memory address to a new area for holding preread data. This assures valid use of preread data frequently accessed.

The control circuit may save the preread data management table to a preread data management table save area of the nonvolatile memory in a predetermined timing. When preread data management tables are being used on the buffer memory or a memory within the control circuit, since a preread data management table of functioning preread data is saved, even preread data on the buffer memory lost due to power off or the like can be restored later. For example, in response to power on, the control circuit reads a preread data management table from the nonvolatile memory, and transfers preread data located by the preread data management table from the nonvolatile memory to the buffer memory.

According to another aspect of the present invention, a memory device includes: a nonvolatile memory; a buffer memory having a higher access speed than the nonvolatile memory; and a control circuit. In response to a read command inputted from the outside, the control circuit consults rewritable preread data management tables that associate logical addresses of preread data and buffer memory addresses for storing the preread data. Then, the control circuit determines whether the buffer memory holds data specified by the command, and if the buffer memory holds the data, outputs data read from the buffer memory to the outside; otherwise, it outputs data read from the nonvolatile memory to the outside.

According to the aforementioned means, by using rewritable preread data management tables, the data to be preread can be flexibly decided to maximize the effect of reducing access time by preread. An increase in the output of preread data from the buffer memory in place of reading from the nonvolatile memory in response to a read command contributes to an improvement in system performance.

As an embodiment of the present invention, the control circuit reads preread data management tables from the nonvolatile memory in response to power on, and transfers preread data located by the read preread data management tables from the nonvolatile memory to the buffer memory. Thereby, preread data having been functioning before power disconnection can be easily restored on the buffer memory later.

[3] According to another aspect of the present invention, a memory device includes a nonvolatile memory, a buffer memory having a higher access speed than the nonvolatile memory, and a control circuit. In response to a preread command inputted from the outside, the control circuit creates a preread data management table that associates a logical address of preread data specified by the command and a buffer memory address for storing the preread data. Moreover, the control circuit reads data specified by the command from the nonvolatile memory and stores it in the buffer memory as preread data so that the preread data stored in the buffer memory can be outputted to the outside. In this way, preread data can be specified from the outside of the memory device by the preread command. Accordingly, the data to be preread can be flexibly decided so that the effect of reducing access time by preread can be maximized.

As an embodiment of the present invention, the control circuit performs the following processing when there is no unused area for storing preread data in the buffer memory. That is, the control circuit allows selection between permission and inhibition of overwriting to areas already holding preread. Selection of the former is convenient to dynamically interchange preread data. Selection of the latter makes it easy to ensure valid use of preread data frequently accessed. When the latter is selected, when there is no unused area, an error response may be returned to a preread command issuer to warn the user. The aforementioned overwrite permission may be total permission for overwriting to an area already holding preread data or partial permission for overwriting to an area infrequently accessed. The partial permission conveniently satisfies both dynamic interchangeability of preread data and valid usability of preread data frequently accessed.

In response to a read command inputted from the outside, the control circuit consults the preread data management table to determine whether the buffer memory holds data specified by the command. If the buffer memory holds the data, the control circuit outputs data read from the buffer memory to the outside; otherwise, it outputs data read from the nonvolatile memory to the outside.

In response to a write command inputted from the outside, the control circuit consults the preread data management table to determine whether the buffer memory holds data of a write address specified by the command. If the buffer memory holds the data, the control circuit updates the data of the buffer memory by write data along with data of the nonvolatile memory; otherwise, it updates data of the nonvolatile memory by the write data.

BRIEF DESCRIPTION OF THE DRAWINGS

FIG. 4 is an explanatory drawing showing the main specifications of a preread command;

FIG. 7 is an explanatory drawing illustrating processing modes (preread data update modes) when there is no unused area for storing preread data in the buffer memory;

FIG. 8 is a flowchart illustrating a control procedure of read command response processing; and FIG. 9 is a flowchart illustrating a control procedure for write command response processing.

DESCRIPTION OF THE PREFERRED EMBODIMENTS

<<Flash Memory Card>>

Figure 1:
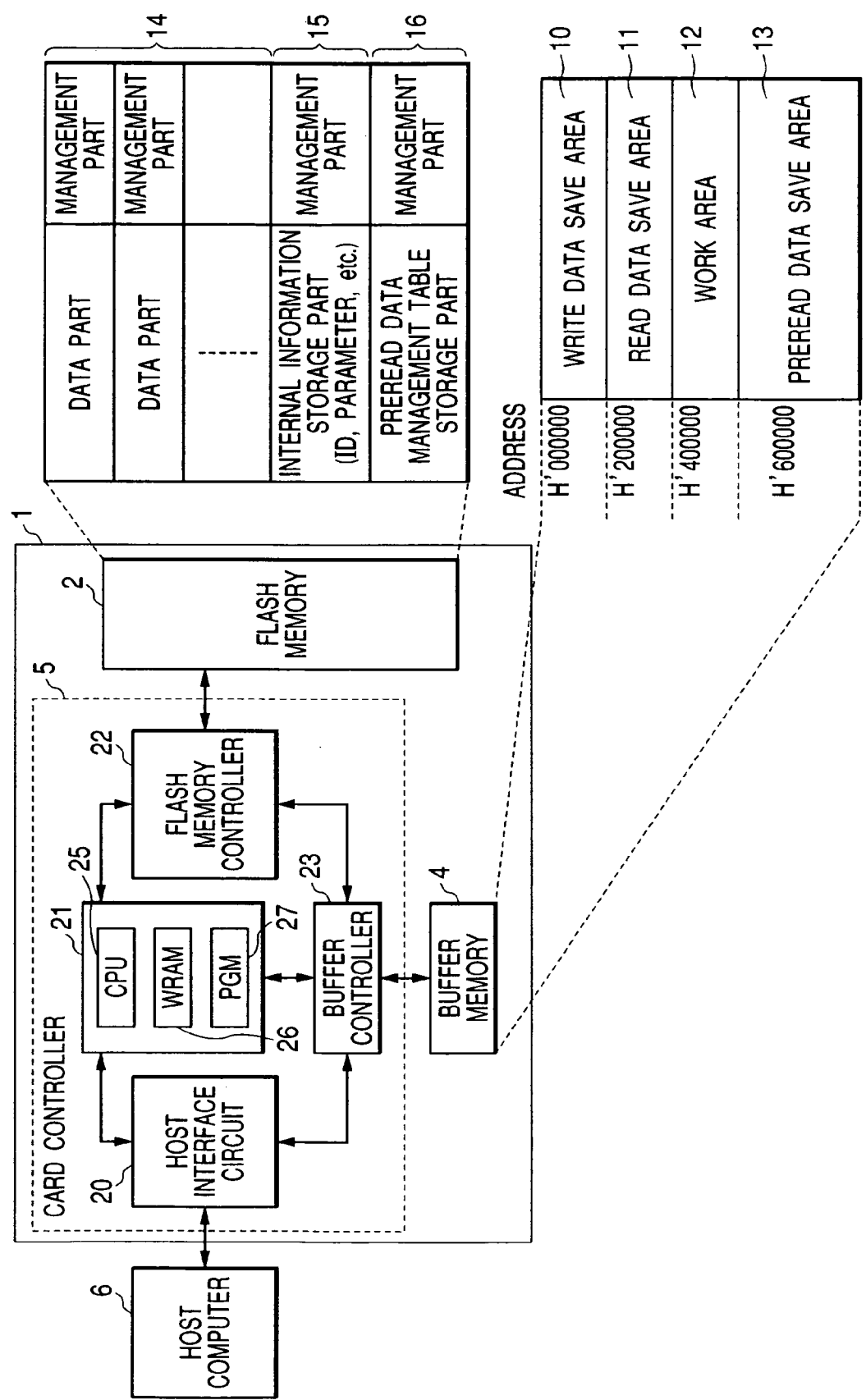
FIG. 1 is a block diagram showing a flash memory card, which is an example of a memory device according to the present invention.

FIG. 1 shows a flash memory card, which is an example of a memory device according to the present invention. A flash memory card 1 shown in the drawing includes the following components on a mounting board: an electrically erasable and programmable memory flash memory 2, which is a nonvolatile memory, a buffer memory 4 comprising a DRAM (Dynamic Random Access memory), SRAM (Static Random Access Memory), or the like, and a card controller (control circuit) 5 that performs memory control and external interface control. The flash memory card 1 is controlled as a file memory device by a host computer 6. That is, when accessing a file, the host computer 6 consults FAT (file allocation table) formed in the flash memory card 1, acquires the logical addresses of sectors making up the file, and uses the logical addresses to issue an access command to the flash memory card 1. In response to the access command, the flash memory card 1 controls access to the flash memory 2 and the buffer memory 4.

The card controller 5, according to a read command, write command, preread command, or the like given from the host computer 6, controls access to the buffer memory 4 and the flash memory 2. The read command specifies the start logical address of read sectors and the number of the sectors to read data. The write command specifies the start logical address of write sectors and the number of the sectors to write data. The preread command creates a preread data management table associating the logical address of data to be preread, and the buffer memory address where the data to be preread is stored, reads the data to be preread from the flash memory 2, and stores it in the buffer memory 4 as preread data. Processing for the individual commands will be described in detail later.

Figure 2:
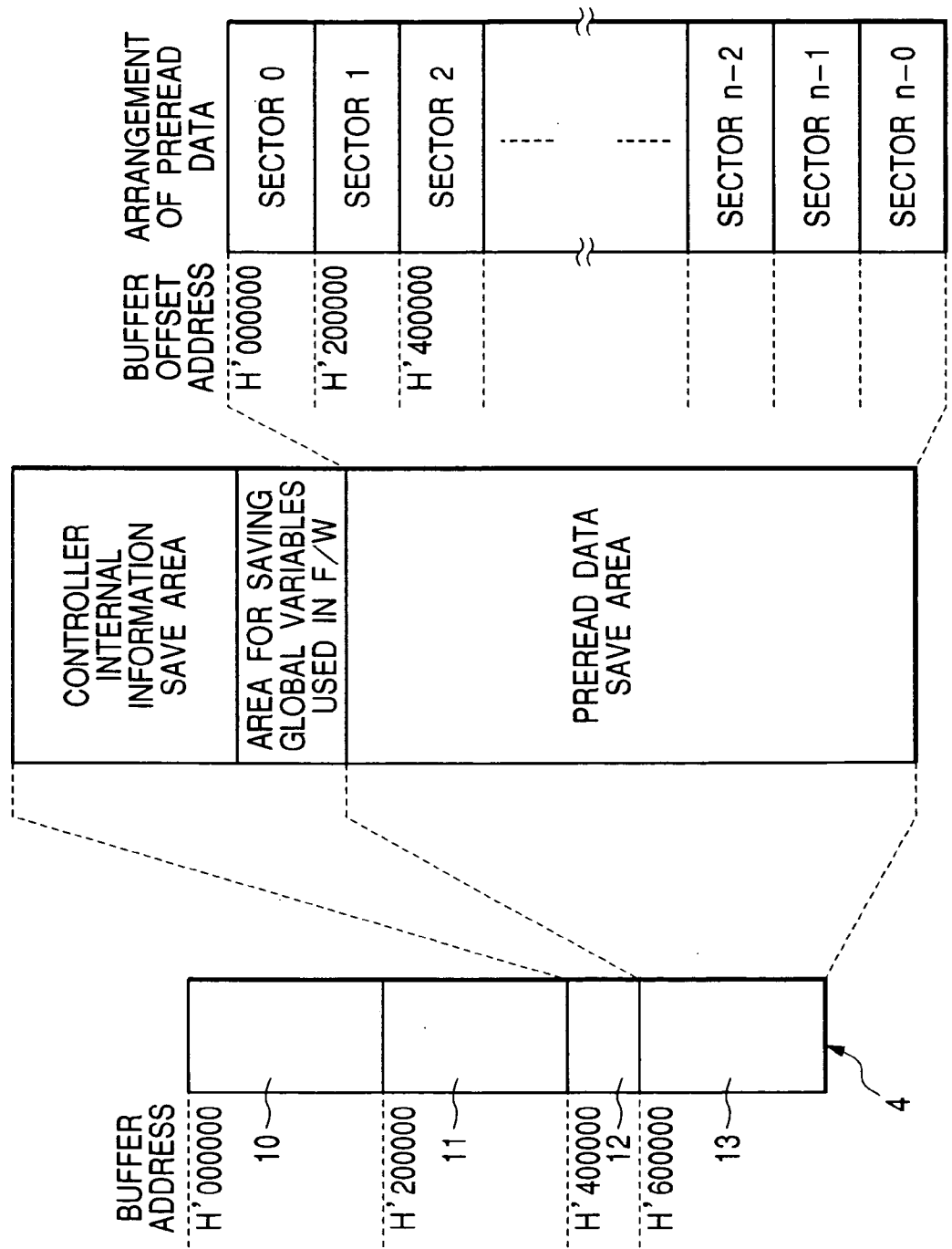
FIG. 2 is an explanatory drawing illustrating details of an address map of buffer memory.

A storage area of the buffer memory 4 includes an area for temporarily saving write data supplied from the host computer 6 (write data save area 10), an area for temporarily saving data that is read from the flash memory 2 and outputted to the host computer 6 (read data save area 11), a work area 12, and an area (preread data save area 13) for saving data read from the flash memory 2 in response to the preread command as preread data. FIG. 2 shows details of an address map of the buffer memory 4. Preread data is always placed on the buffer memory and occupies a storage area of the buffer memory. Therefore, the buffer memory is managed separately from the buffer areas 10 and 11 usually used for writing and reading.

Storage areas of the flash memory 2 include a data part 14, an internal information storage part 15, and a preread data management table storage part 16, each of which is provided with a management part. The internal information storage part 15 stores ID, RD (root directory), FAT (file allocation table), and the like of the memory card 1, which can be referred to by the OS (operating system) of the host computer 6. The preread data management table storage part 16 stores preread data management tables created in response to the preread command.

The flash memory 2 has a memory array ARY (not shown in the drawing) in which a large number of electrically erasable and programmable nonvolatile memory cell transistors are arranged in a matrix form. The memory cell transistors (also referred to as flash memory cells), though not shown, have a stacked gate structure comprising a source and a drain formed on a semiconductor board or well, a floating gate formed in a channel region between the source and the drain through a tunnel oxide film, and a control gate stacked on the floating gate through an interlayer insulating film. The control gate is connected to a corresponding word line, the drain to a corresponding bit line, and the source to a source line. The memory cell transistors rise in threshold voltage when an electron is injected to the floating gate. On the other hand, when an electron is extracted from the floating gate, the threshold voltage drops. The memory cell transistors store information according to a rise or drop in threshold voltage with respect to word line voltages (control gate applied voltages) for reading data. Though there is no particular limitation, this specification refers to as an erase state the state in which threshold voltage of the memory transistors is low, and as a write state the state in which it is high.

In FIG. 1, the card controller 5 includes a host interface circuit 20, a microprocessor (MPU) 21 as an operation control means, a flash controller 22, and a buffer controller 23. The flash controller 22 includes an ECC circuit (not shown).

The MPU 21, which includes a CPU (Central Processing Unit) 25, a program memory (PGM) 26, and a work RAM (WRAM) 27, and the like, controls the whole card controller 5. The program memory 26 holds an operating program and the like of the CPU 25.

The host interface circuit 20 establishes an interface with the host computer 6 such as a personal computer or a workstation according to predetermined programs such as ATA (ATAttachment), IDE (Integrated Device Electronics), SCSI (Small Computer System Interface), MMC (MultiMediaCard: a registered trademark), and PCMCIA (Personal Computer Memory Card International Association).

The buffer controller 23 controls access to the buffer memory 4 according to access commands given from the MPU 21.

The flash controller 22, according to access commands given from the MPU 21, controls a read operation, an erase operation, and a write operation on the flash memory. The ECC circuit (not shown), according to commands given from the MPU 21, generates an error correction code for the data to be written to the flash memory 2, and adds it to the write data. Also, the ECC circuit performs error detection/correction processing on data read from the flash memory 2 by using an error correction code added to the read data and corrects an error, if any, in the range of the error correction capability.

Figure 3:
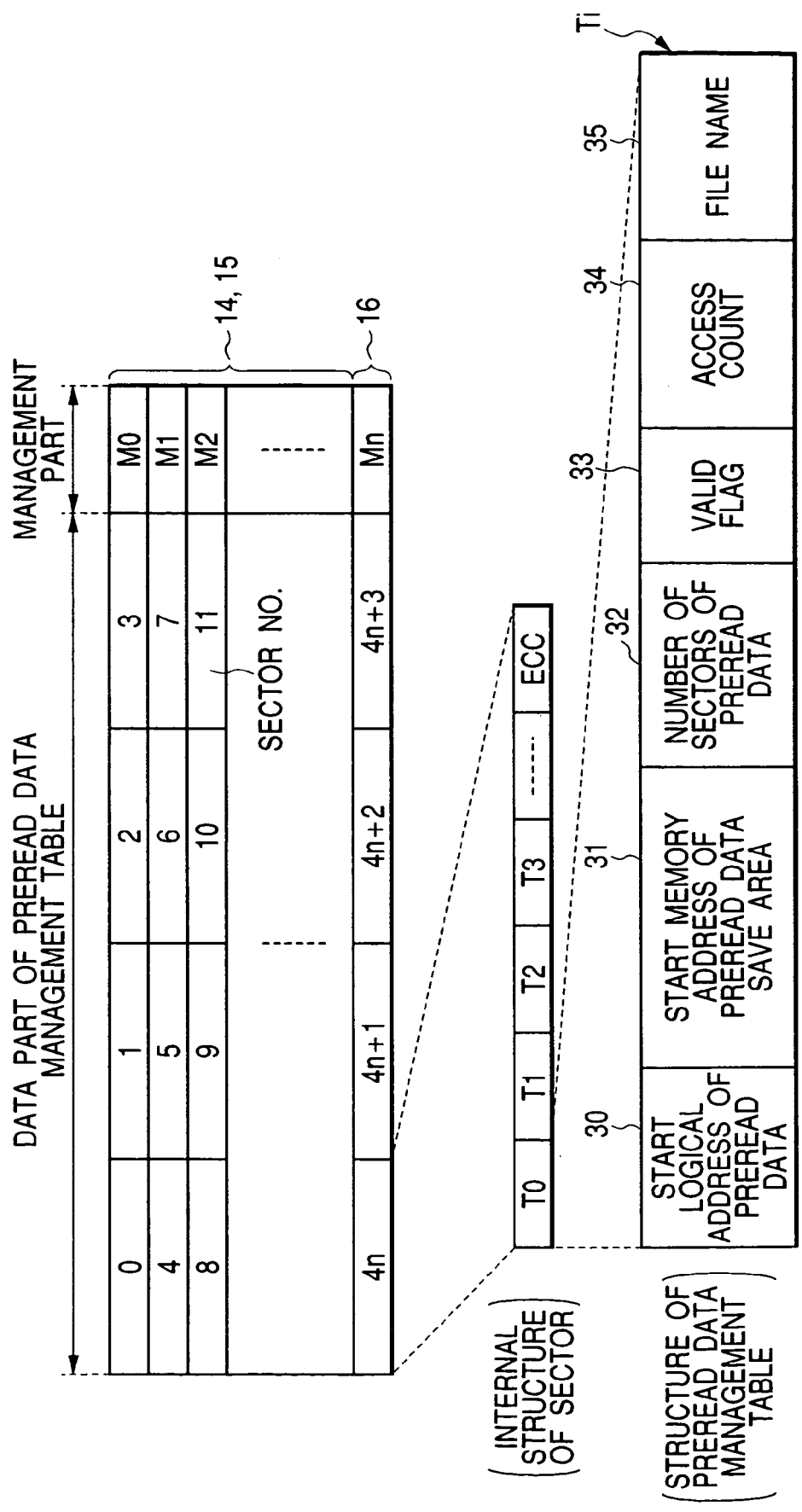
FIG. 3 is an explanatory drawing illustrating details of the configuration of a storage area of a flash memory and a preread data management table.

FIG. 3 shows details of the structure of a storage area of the flash memory 2 and a preread management table. As shown in the drawing, a storage area (memory array) of the flash memory 2 has memory sectors of numbers 0 to $4n+3$ and n blocks from M0 to Mn making up management parts. Each memory sector and each management part each have a physical address, and a logical address is assigned to each memory sector. A logical address is a sector number of a file (file sector number), for example. In subsequent descriptions, a memory sector address will be simply referred to as a physical address or physical sector address. It is to be noted that a logical address is an address specified from the outside and a physical address is an address for accessing the inside by a logical address. The memory sectors correspond to 512B (bytes) of storage sectors, which are a rewrite unit of storage such as HDD (hard disk drive). Valid flags, substitution flags, and the like of blocks are stored in the management areas. ECC code is provided for each of the memory sectors. Nonvolatile memory cells making up one block are selected by one word line or one kind of word line selection signal. Thus, erase processing and write processing are performed in units of the memory cells; for example, a high voltage necessary for erase processing and write processing is applied in units of word lines.

The memory sectors $4n$ to $4n+3$ constitute the aforementioned preread data management table storage part 16. Each memory sector of the preread data management table storage part 16 stores plural preread data management tables Ti (T0, T1, T2 . . . ) and ECC code. Since a preread data management table is added when response processing is performed for a preread command, plural preread data management tables may exist.

A preread data management table Ti includes a start logical address area 30, a start memory address area 31, a sector number area 32, a valid flag area 33, an access count area 34, and a file name area 35. The start logical address area 30 stores the start logical address (logical sector address) of preread data. The start memory address area 31 stores the start memory address of the area that holds preread data on the buffer memory. The sector number area 32 stores the number of sectors of the preread data. The valid flag area 33 stores a flag indicating whether or not the preread data management table is valid. The access count area 34 stores the number of accesses by the host computer 6 to the preread data managed by the write management table. The file name area 35 holds the file name to which the preread data belongs.

The preread data management tables may be managed on either the flash memory 2 or the buffer memory 4. In the case where they are managed on the flash memory 2, each time the preread data management tables are created or deleted, erase and write operations on the preread data management tables 16 are performed. As a result, processing becomes slow. In the case where they are managed on the buffer memory 4, they are quickly created or deleted. However, at power off, the preread data management tables must be saved to the flash memory 2. It is desirable that, when power is turned on, the preread data management tables are read from the flash memory 2 and preread data located by the read preread data management tables is transferred from the flash memory to the buffer memory 4.

<<Preread Command Response Processing>>

FIG. 4 shows major specifications of preread commands. Preread data may be specified by specifying an address or a file name. When specifying preread data with an address, a user of the memory card 1 specifies an area of the preread data by a logical address. When specifying preread data with a file name, the user specifies the name of a file storing the preread data. If the file name is specified to contain an absolute path name indicating the location of the file, duplicate file names can also be easily specified, easing file search.

Generally, a user of the memory device may be unable to keep track of logical addresses on the flash memory card 1 managed by the OS. It is convenient for a user of the flash memory card 1 to keep track of data by a file name. Thus, by specifying file names, satisfactory operability on data preread can be achieved. There may be the case where logical addresses of the flash memory cannot be managed by the OS. Even in such a case, preread data can be specified by file names.

Preread data is stored in the buffer memory 4 from the flash memory 2 when a preread command is issued, or in background mode in a command wait state after a preread data management table has been created in advance. Storing the preread data in the command wait state prevents the occurrence of the situation in which read access or other operations are delayed because of a transfer of the preread data from the flash memory 2 to the buffer memory 4.

Figure 5:
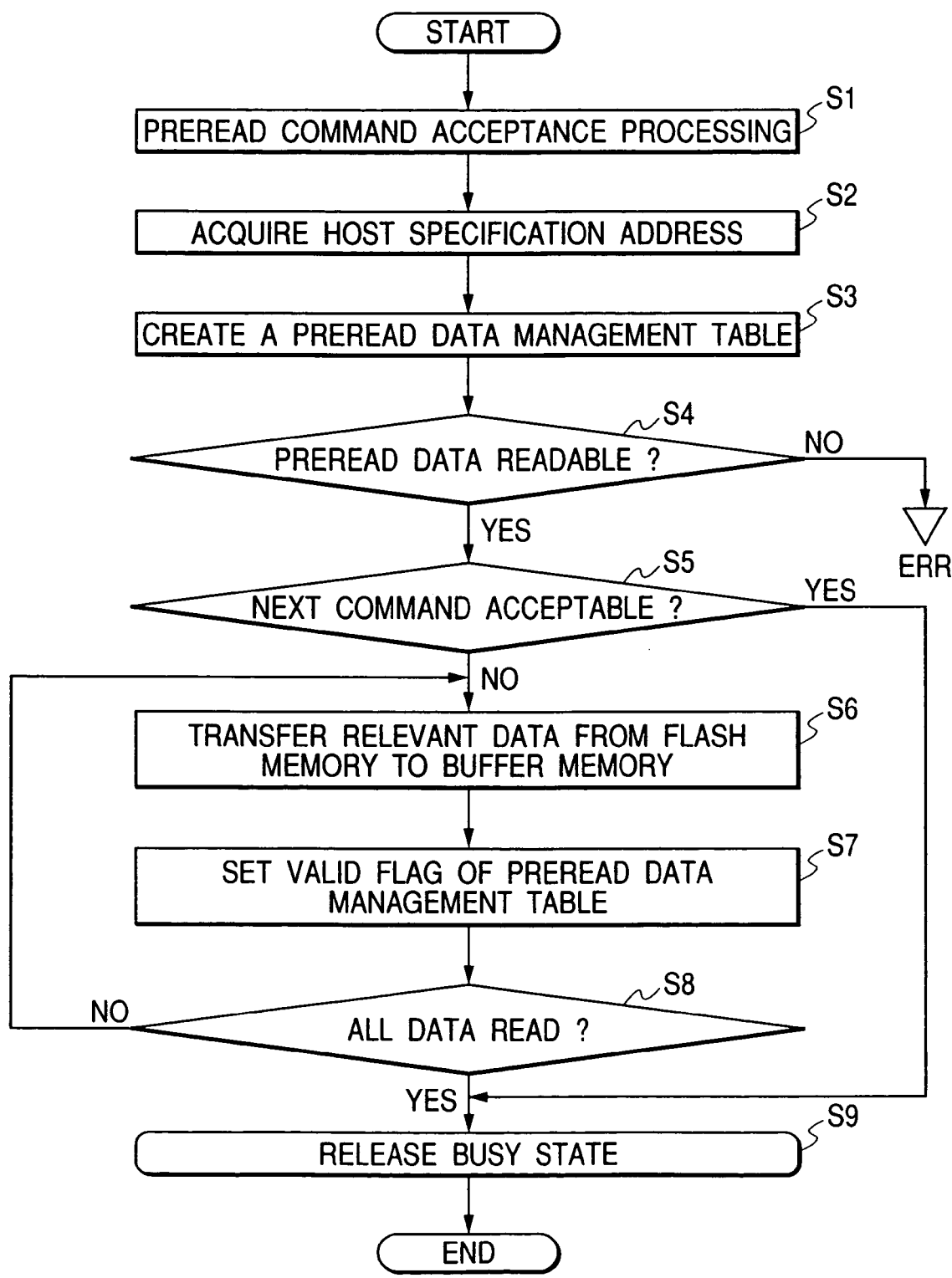
FIG. 5 is a flowchart illustrating a control procedure of preread command response processing.

FIG. 5 shows a control procedure for preread command response processing. Upon accepting a preread command issued from the host computer 6 (S1), the card controller 5 obtains a physical address of preread data specified with a logical address or a file name by the command (S2). A preread data management table is created based on the logical address of the preread data specified by the preread command, the physical address corresponding to the logical address, and the like (S3). The preread data management table is created in, e.g., the work area 12 of the buffer memory 4. It is determined whether preread data defined in the created preread data management table can be actually read (S4). This is done to detect the cases where the specified file does not exist, or the specified logical address is not associated with blocks of the flash memory. If the preread data cannot be read, an error code is returned to the host computer 6. If the preread data can be read, whether a next command is acceptable is determined. Otherwise, that is, if no other access command is issued from the host computer 6, the preread data is read from the flash memory 2 and written to the buffer memory 4 (S6), and a valid flag is set in the valid flag area 33 of the corresponding preread data management table (S7). If the number of sectors of the preread data is two or more, control is returned to the steps S6 and S7 to repeat the same processing for a succeeding sector (S8). A preread address of the flash memory 2 necessary to preread succeeding sector data and a preread data write address of the buffer memory may be successively obtained by address calculations of the microprocessor 11. When all sector data defined by the preread data management table created in step S3 has been preread, the busy state caused by the current preread command acceptance is released (S9), and the next command is accepted and executed.

It goes without saying that the determination processing in the step S5 may be canceled to adopt a processing procedure for automatic continuation of processing following the step S6. As a method of processing switching in the case (determination about whether to perform processing of the step 5), the card controller 5 itself may have a setting switching function, or a preread command may be provided with control information for function switching.

When an access command has been supplied from the host computer, the valid flag 33 of the preread data management tables is checked. As a result, only preread data management tables having the set valid flag 33 are to be searched to obtain the location of the preread data to be used.

Figure 6:
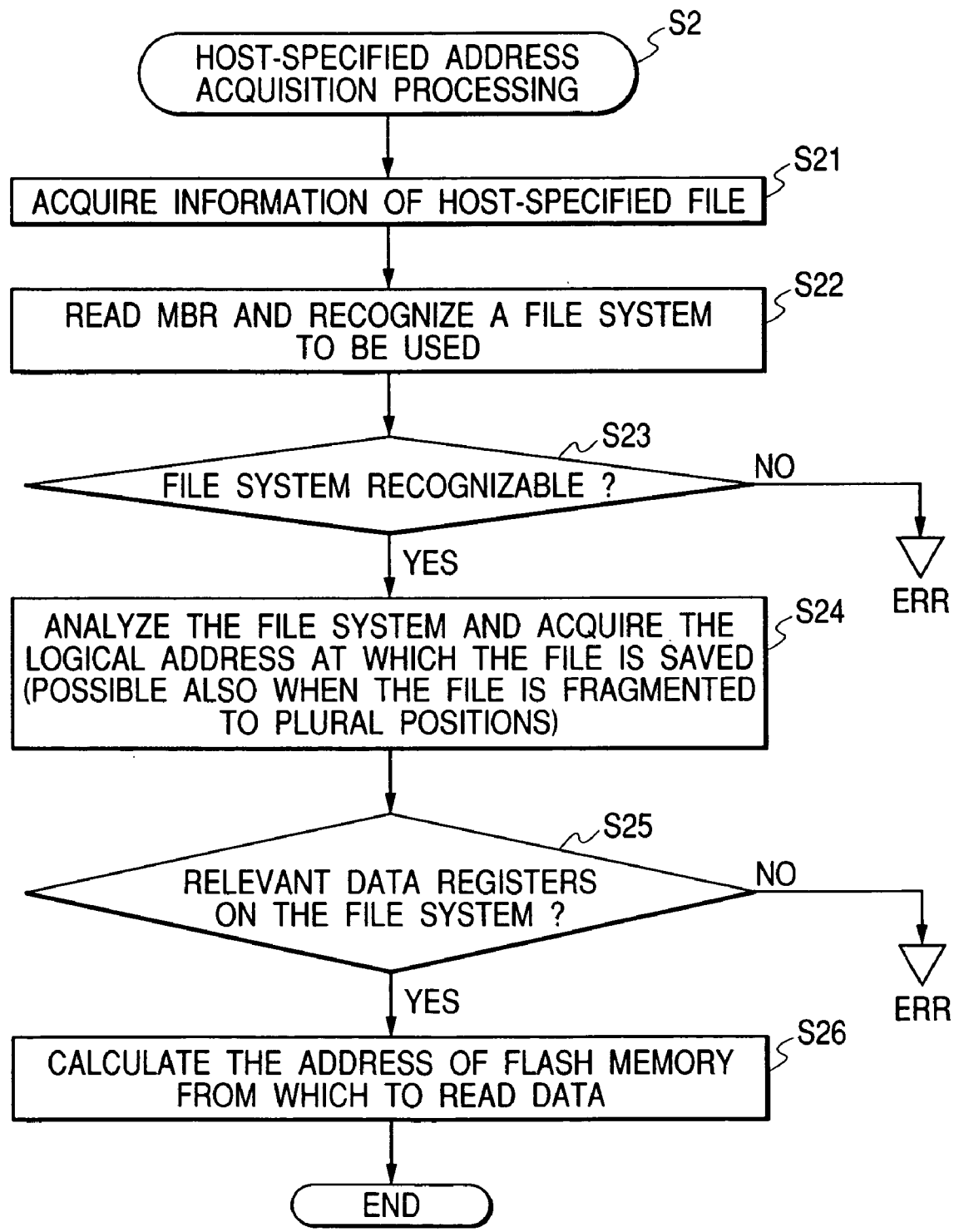
FIG. 6 is a flowchart showing a concrete example of host-specified address acquisition processing (S2)

FIG. 6 shows an embodiment of the aforementioned host-specified address acquisition processing (S2). Processing shown in the drawing is response processing in the case where preread data is specified with a file name by a preread command supplied from the host computer 6. A file name holding preread data is obtained from the preread command (S21). Next, a partition ID of a master boot record area (MBR) of the flash memory 2 is read to recognize the file system to be used (S22). Whether the file system to be used can be recognized is determined (S23). If it can be recognized, the file system is analyzed using FAT and the like on the flash memory 2, and the logical address at which the file is saved is obtained. Even if the file is fragmented, the logical address at which the file is saved is obtained in the same way. After it has been confirmed that relevant data exists on the file system (yes of S25), a memory address of the flash memory is calculated. In the system in which the association between logical addresses and physical addresses of the flash memory 2 is variable, the physical address of the flash memory 2 is calculated by consulting an address conversion table defining the relationship between logical addresses and physical addresses. The address conversion table is held in a predetermined area of the flash memory 2.

The user cannot manage logical addresses on the file system. Accordingly, specification by a file name enables the user to manage preread data.

When a file is fragmented, since a preread data management table has a structure shown in FIG. 3, it is necessary to create a preread data management table for each of fragmented portions in which logical addresses are contiguous. Even the existence of plural preread data management tables for one data file causes no interference on search processing during response to an access command because each of the preread data management tables has a file name in its file name area 35.

Since plural identical file names may exist on the flash memory 2, it is desirable that a file name to be saved in a preread data management table contains an absolute path name as well. Alternatively, since even identical file names have different logical addresses in the file system, a file name to be saved in a preread data management table may contain a logical address.

FIG. 7 shows processing modes (preread data update modes) when the buffer memory 4 has no unused area to store preread data.

Processing modes when the buffer memory 4 has no unused area to store preread data include permission for overwriting to an area already holding preread data and inhibition of overwriting to an area already holding preread data.

The adoption of the overwrite inhibition mode ensures valid use of preread data frequently accessed. When the overwrite inhibition mode is adopted, if there is no unused area, an error response may be returned to a preread command issuer to warn the user. The adoption of the overwrite permission allows dynamic interchange of preread data.

The overwrite permission modes include total permission for overwriting to an area already holding preread data or partial permission for overwriting to an area infrequently accessed. In the case of total permission for overwrite, the card controller 5 gives permission to successively overwrite older preread data in the preread data save area 13 earlier in FIFO (first-in, first-out) order.

In the case where partial permission based on access frequency is adopted, whether a given area is an area infrequently accessed may be determined based on the value of the access count area 34 of a preread data management table. For example, if an access count of 1 is adopted as the determination criterion, a preread data management table having an access count of 1 is searched for, and if it has been located, a buffer memory address used in the preread data management table may be used. Also, a buffer memory address may be used which is managed in a preread data management table having the smallest access count obtained as a result of searching an arbitrary number of preread data management tables.

The aforementioned partial permission conveniently satisfies both dynamic interchangeability of preread data and usability of preread data frequently accessed.

The aforementioned preread data update modes may be set in the card controller 5 in the form of control data or a mode signal. Alternatively, each time, a preread command may specify a preread data update mode.

<<Read Command Response Processing>>

FIG. 8 shows a control procedure of read command response processing. Upon accepting a read command issued from the host computer 6 (S30), the card controller 5 determines whether preread data management tables corresponding to logical addresses specified in the read command exist (S31). If no preread data management tables exist for all the specified logical addresses, the card controller calculates the physical sector address of the flash memory that corresponds to a logical address for reading (S32). Then, the card controller 5 reads data from the physical sector address and transfers it to the read data save area of the buffer memory (S33), and outputs the data transferred to the read data save area to the host computer 6 (S34).

In the step S31, when it is determined that preread data management tables exist for the specified logical addresses, whether all data has been preread is determined (S35). In short, it is determined whether all the logical addresses specified in the read command match logical addresses associated by the preread data management tables. If it is determined that partial preread data does not exist, the physical sector address of the flash memory corresponding to the logical address in which the preread data does not exist is calculated (S36), and data from the physical sector address is read and transferred to the read data save area of the buffer memory 4 (S33). For the logical address in which partial preread data exists, access count of a corresponding preread data management table is incremented by one (S37). The data transferred to the read data save area in the step S33 and remaining preread data in the preread data save area 13 are outputted to the host computer 6 (S34). If preread data exists for all logical addresses, access count of preread data management tables corresponding to the logical addresses is incremented by one (S37), and corresponding preread data in the preread data save area 13 is outputted to the host computer 6 (S34).

In the processing of FIG. 8, when preread data is not complete, lacking data is transferred from the flash memory 2 to the buffer memory 4 before being transferred to the host computer 6. Before reading lacking data from the flash memory 2 to the buffer memory 4, preread data may be transferred to the host computer 6.

<<Write Command Response Processing>>

FIG. 9 shows a control procedure of write command response processing. Upon accepting a write command issued from the host computer 6 (S40), the card controller 5 temporarily stores write data supplied from the host computer 6 in the write data save area 10 (S41). The card controller 5 calculates a physical sector address on the flash memory 2 corresponding to a logical address specified in the write command (S42). Then, it gives a write command to the flash memory 2 to direct writing to the flash memory 2 (S43). In parallel with the write operation on the flash memory 2, the card controller 5 determines whether a preread data management table on the write data exists (S44). If valid preread data concerned in the write data exists, the preread data is updated by the write data on the buffer memory 4 (S47), and the contents of the preread data management table are updated (S48). For example, access count is incremented by one. After the termination of the processing of the step S48, or if there is no corresponding preread data as a result of the processing of the step S44, the card controller 5 waits for the writing to the flash memory to terminate. Then, it releases the busy flag set by the write command (S46). Thus, the processing terminates.

When preread data is updated, data in the preread data save area on the buffer must be updated at the same time as data on the flash memory. Accordingly, although it is necessary to monitor addresses during a write request at all times, a great reduction in performance does not occur because updating on the buffer memory 4 is much faster than storing to the flash memory.

<<Saving Preread Data Management Tables>>

When preread data management tables are being used on a nonvolatile memory such as the work area 12 on the buffer memory 4, the card controller 5 saves the preread data management tables to the data management table save area of the flash memory 2 in a predetermined timing. The predetermined timing refers to power-off time or a command wait state after a predetermined period. By saving a preread data management table of functioning preread data, even if the preread data on the buffer memory 4 is lost due to power off or the like, it can be restored later. In response to power on, the card controller 5 reads the preread data management table from the flash memory 2, and transfers preread data located by the preread data management table from the flash memory 2 to the buffer memory 4.

As has been described above, the following effects can be obtained by the flash memory card 1.

[1] The host computer 6 can specify preread data for the flash memory card 1 by preread commands. Accordingly, the data to be preread can be flexibly decided so that the effect of reducing access time by preread can be maximized. The read performance of the flash memory card 1 depends on the read performance of the flash memory 2 itself, which is a storage medium. Thus, upon a read request from the host computer 6, by increasing the output of preread data from the buffer memory 4 in place of reading from the flash memory 2, system performance can be improved.

[2] The preread command can specify preread data by any of logical addresses and file names. For example, the preread commands have a logical address specification field and a file name specification field. As typified by a master boot record or FAT (file allocation table), since there are cases where users can easily keep track of logical addresses, specification by logical addresses is advantageous in that preread data can be directly specified.

There are cases where users of the flash memory card 1 cannot keep track of logical addresses on the flash memory 2 that are managed by the OS. The users can conveniently keep track of data by file names, so that satisfactory operability on data preread can be achieved.

[3] The card controller 5 transfers preread data to the buffer memory 4 not only during execution of a preread command, but also in a predetermined timing after beforehand creation of a preread data management table. Thereby, the card controller 5 can transfer preread data to the buffer memory 4 in a command wait state after the termination of execution of the preread command. The preread processing prevents reduction in data processing efficiency caused by a delay in read access and other operations due to preread processing.

[4] A preread data management table has an area for holding a file name containing preread data, as well as areas for holding a start logical address of the preread data, a start memory address of an area storing the preread data, and a data count of the preread data. Because of this structure of the preread data management table, in the file system, when a file is fragmented, one piece of file data is managed by plural split preread data management tables. Accordingly, in response processing for read access or the like, corresponding preread data management tables can be searched by a file name, so that access speed to required preread data on the buffer memory is further increased.

[5] The preread data management table has an area 34 for holding the number of accesses to preread data by the host computer 6. Thereby, when there is no unused area for storing preread data in the buffer memory 4, the card controller 5 searches for a buffer memory address infrequently accessed, based on an access count held in the preread data management table, and can allocate an area of the located buffer memory address to a new area for holding preread data. This assures valid use of preread data frequently accessed.

[6] The card controller 5 saves preread data management tables to the preread data management table save area of the flash memory 2 in a predetermined timing. Thereby, when the preread data management tables are being used on the buffer memory 4 or work RAM 26, since a preread data management table of functioning preread data is saved, even preread data on the buffer memory lost due to power off or the like can be restored later.

Although the invention made by the inventor has been described in detail based on preferred embodiments, the present invention is not limited to the embodiments. It goes without saying that the invention may be modified in various ways without departing from the spirit and scope thereof.

For example, the file system may be the NTFS or other file systems though the FAT system is used in the above description. Although a nonvolatile memory is used as the flash memory in the above description, other semiconductor memories such as a ferroelectric memory may be used. Moreover, the nonvolatile memory may be a recording disk such as hard disk, without being limited to semiconductor memories. The present invention can apply to hard disk drives without being limited to memory cards such as flash memory cards. In this case, a memory device may be fixedly placed in a mounting system, without being limited to a removable apparatus.

The flash memory may, without being limited to the stacked gate structure, employ the split gate structure in which a selection MOS transistor and a memory MOS transistor are formed in series without a diffusion layer being provided therebetween. Also, like a silicon nitride film, a memory cell structure may be employed in which charges are stored locally in a trap area. The semiconductor nonvolatile memory may store 2 bits or more of information in one memory cell as well as store 1-bit information in one memory cell.

The present invention may also apply to a memory card having a control circuit such as a card controller that does not include a host interface circuit such as IDE but is standardized to leave its function to host computers.

Logical addresses of preread data specified in a preread command may substantially match physical addresses of a nonvolatile memory depending on configuration the file system has.

An effect obtained by representative examples of the invention disclosed in this patent application is briefly described below.

Preread data can be specified by preread commands from the outside of a memory device. Therefore, the data to be preread can be flexibly decided to maximize the effect of reducing access time by preread. During a read request from the outside, the data to be preread is outputted from a buffer memory more frequently than read from a memory device. As a result, the data processing performance of the system using the memory device can be increased.

What is claimed is:

1. A memory device comprising: a nonvolatile memory; a buffer memory having a higher access speed than the nonvolatile memory; and a control circuit, wherein the control circuit creates a preread data management table that associates a logical address of preread data specified by a preread command inputted from the outside and a buffer memory address for storing the preread data, reads data specified by the command from the nonvolatile memory and stores the data in the buffer memory as preread data, and when a logical address specified in a read command inputted from the outside matches a logical address associated by the preread data management table, outputs corresponding preread data from the buffer memory, and wherein the control circuit saves preread data management tables to a preread data management table save area of the nonvolatile memory in a predetermined timing.

2. The memory device according to claim 1, wherein the preread command specifies preread data by a logical address.

3. The memory device according to claim 1, wherein the preread command specifies preread data by a file name.

4. The memory device according to claim 3, wherein the preread data management table includes an area for holding a file name containing preread data.

5. The memory device according to claim 1, wherein the control circuit transfers preread data to the buffer memory during execution of a preread command.

6. The memory device according to claim 1, wherein the control circuit creates a preread data management table before transferring preread data to the buffer memory.

7. The memory device according to claim 6, wherein the control circuit transfers preread data to the buffer memory in a command wait state after the termination of execution of a preread command.

8. The memory device according to claim 7, wherein the preread data management table includes an area for holding a flag indicating the validity of corresponding preread data.

9. The memory device according to claim 1, wherein the preread data management table includes areas for storing a start logical address of preread data, a start memory address of an area storing the preread data, and a data count of the preread data.

10. The memory device according to claim 1, wherein the preread data management table includes an area for holding an access count of preread data.

11. The memory device according to claim 10, wherein, when no unused area for storing preread data is present in the buffer memory, the control circuit searches for a buffer memory address infrequently accessed, based on an access count held in the preread data management table, and allocates an area of the located buffer memory address to a new area for storing preread data.

12. The memory device according to claim 1, wherein in response to power on, the control circuit reads a preread data management table from the nonvolatile memory, and transfers preread data located by the preread data management table from the nonvolatile memory to the buffer memory.

13. A memory device including: a nonvolatile memory; a buffer memory having a higher access speed than the nonvolatile memory; and a control circuit,
wherein, in response to a read command inputted from the outside, the control circuit consults rewritable preread data management tables that associate logical addresses of preread data and buffer memory addresses for storing the preread data, determines whether the buffer memory holds data specified by the command, if the buffer memory holds the data, outputs data read from the buffer memory to the outside, and otherwise, outputs data read from the nonvolatile memory to the outside, and
wherein the control circuit reads preread data management tables from the nonvolatile memory in response to power on, and transfers the preread data from a location of the nonvolatile memory indicated by the read preread data management tables to the buffer memory.

14. A memory device including: a nonvolatile memory; a buffer memory having a higher access speed than the nonvolatile memory; and a control circuit,
wherein in response to a preread command inputted from the outside, the control circuit creates a preread data management table that associates a logical address of preread data specified by the command and a buffer memory address for storing the preread data, and reads data specified by the command from the nonvolatile memory and stores the data in the buffer memory as preread data so that the preread data stored in the buffer memory can be outputted to the outside, and
wherein the control circuit reads preread data management tables from the nonvolatile memory in response to power on, and transfers the preread data from a location of the nonvolatile memory indicated by the read preread data management tables to the buffer memory.

15. The memory device according to claim 14, wherein when no unused area for storing preread data is present in the buffer memory, the control circuit allows selection between permission and inhibition of overwriting to areas already holding preread data.

16. The memory device according to claim 15, wherein the overwrite permission is total permission for overwriting to an area already holding preread data or partial permission for overwriting to an area infrequently accessed.

17. The memory device according to claim 14, wherein, in response to a read command inputted from the outside, the control circuit consults the preread data management table to determine whether the buffer memory holds data specified by the command, and if the buffer memory holds the data, outputs data read from the buffer memory to the outside, otherwise, outputs data read from the nonvolatile memory to the outside.

18. The memory device according to claim 17, wherein, in response to a write command inputted from the outside, the control circuit consults the preread data management table to determine whether the buffer memory holds data of a write address specified by the command, and if the buffer memory holds the data, updates the data of the buffer memory by write data along with data of the nonvolatile memory, otherwise, updates data of the nonvolatile memory by the write data.

19. The memory device according to claim 14, wherein, in response to a write command inputted from the outside, the control circuit consults the preread data management table to determine whether the buffer memory holds data of a write address specified by the command, and if the buffer memory holds the data, updates the data of the buffer memory by write data along with data of the nonvolatile memory, otherwise, updates data of the nonvolatile memory by the write data.

20. A memory device comprising:
a nonvolatile memory;
a buffer memory having a higher access speed than the nonvolatile memory; and
a control circuit;
wherein the control circuit reads a preread data management table from the nonvolatile memory in response to power on, and reads preread data from a location of the nonvolatile memory indicated by the preread data management table to the buffer memory.

* * * * *